May 31, 1966  J. R. CHIVERS  3,253,536
TOASTER WITH SIGNAL MEANS
Filed June 7, 1963  2 Sheets-Sheet 1

INVENTOR.
James R. Chivers
BY
ATTORNEY

United States Patent Office 3,253,536
Patented May 31, 1966

3,253,536
TOASTER WITH SIGNAL MEANS
James R. Chivers, Madison Township, Richland County, Ohio, assignor to Westinghouse Electric Corporation, East Pittsburgh, Pa., a corporation of Pennsylvania
Filed June 7, 1963, Ser. No. 286,416
5 Claims. (Cl. 99—344)

This invention relates to electric toasters of the automatic or "pop up" type and concerns particularly such toasters in which there is some provision for keeping the toasted bread warm after completion of the toasting operation.

Automatic electric toasters in which the toasted bread pops up to a partially exposed position upon completion of the toasting operation have the disadvantage that unless the toasted bread is used promptly it will cool to an undesirably low temperature unless something is done to keep it warm. Means are known for retaining the toasted bread in the heating compartment without further toasting. However, unless the operator is closely attentive, the toasting may be completed but the operator remains unaware of that fact. Moreover, toast quality is not improved by delay after completion of the toasting operation, even when held at a suitable "keep warm" temperature.

A primary object of the present invention is provision of an automatic electric toaster with a readily discernible signal of the arrival of toasted bread at a non-toasting "keep warm" position within the heating compartment of the toaster.

Another object is damping of the movement of the bread carriage of an automatic electric toaster upon arrival thereof at a non-toasting "keep warm" position within the heating compartment of the toaster.

A further object is combination of both audible signaling and carriage damping in an automatic electric toaster having provision for retaining toasted bread temporarily in the heating compartment following completion of the toasting operation.

Other objects of this invention, together with means and methods for attaining the various objects, will be apparent from the following description and the accompanying diagrams of a preferred embodiment of the invention.

In general, the objects of the present invention are accomplished by providing an electric toaster of automatic or "pop up" type with means for holding the bread carriage at an intermediate non-toasting or "keep warm" position and with either or both signaling and carriage-damping means operative as the bread carriage arrives at such position from toasting position.

Figure 1:
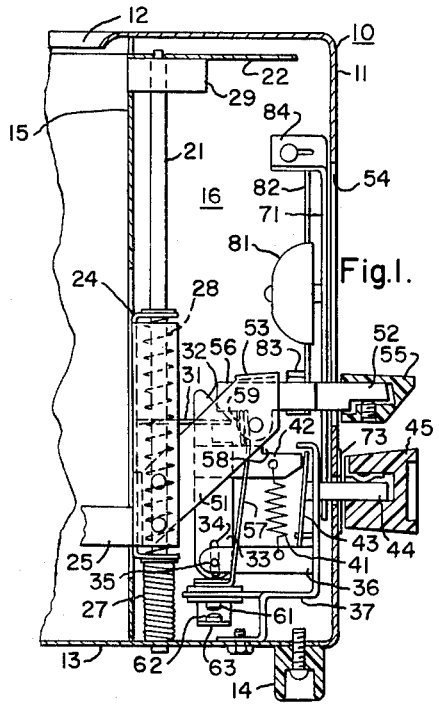
FIG. 1 is a side elevation, partly in section, of a portion of a toaster embodying the present invention, with the bread carriage in toasting position.

FIG. 1 shows, in side elevation and partly in section, a portion of a toaster 10 having a fixed frame including a housing 11 inverted over and attached to a base 13 supported on feet 14 (one visible in this view).

The top of the housing has one or more slots 12 (part of one being visible) therein to receive slices of bread or the like for toasting in the oven or heating compartment located therebelow. The heating compartment occupies most of the space inside the housing and is separated from a smaller control compartment 16 by a partition 15. The structural features of the present invention are located in or about the control compartment and are described and illustrated in detail. The heating compartment and means for heating it are wholly conventional and, being well known, are not further illustrated or described.

Figure 2:
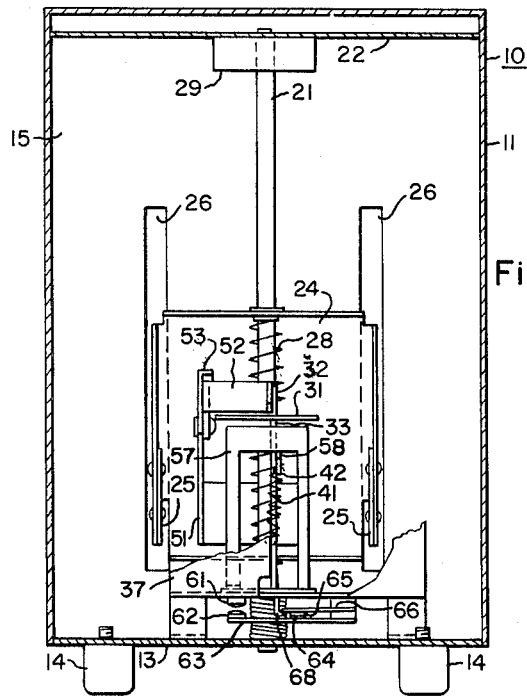
FIG. 2 is an end elevation, partly cut away and in section, of the apparatus of FIG. 1.

FIG. 2 shows, in end elevation (partly cut away and in section) structural elements supported by the frame, most of which were visible in side elevation in FIG. 1. An elongated post or guide rod 21 extends vertically from an aperture in the base 13 to an aperture in a horizontal sheet 22 supported in part by the partition 15 and spaced from the overlying portion of the housing 11. A carriage 24 is mounted for vertically reciprocating movement on the guide rod, which extends through apertures fitted with grommets in top and bottom flanges thereof. A pair of bread-supporting bars 25, which are attached to opposite side flanges of the carriage, extend horizontally through a pair of vertical slots 26 in the partition 15 and into the heating compartment. A biasing spring 27 surrounding the guide rod 21 below the bottom flange of the carriage is compressed between that flange and the base 13 in the illustrated lower position of the carriage, which is the toasting position. A loose helical spring 28 surrounds the guide rod between the top and bottom flanges of the carriage. A resilient bumper 29 surrounds the upper portion of the guide rod immediately below the horizontal sheet 22.

The mechanism for latching the carriage 24 in the toasting position and for unlatching it is essentially like that disclosed by B. F. Parr in U.S. Patent 3,029,725 although the details differ somewhat. The carriage 24 has a central horizontal bracket 31 extending therefrom with an aperture therein (not shown directly) adapted to receive a hook 32 formed at the upper end of an upstanding latch member 33 supported at its lower end, which is provided with a vertical slot 34 therein, for pivotal and limited sliding motion, on pin 35. The pin is retained in a support arm 36 affixed to a frame superstructure 37, which is fastened to the base 13. A biasing spring 41 for the latch member is affixed at its lower end to the support arm 36 and at its upper end to an arm 42, which is affixed to the latch member and extends substantially horizontally therefrom in the direction in which the hook 32 extends from the latch member (to the right in FIG. 1). A desegmented disc cam 43, affixed to one end of a rotatable shaft 44, is juxtaposed to the free end of the arm 42, which acts as a cam follower, controlling the degree of engagement of the hook 32 with horizontal bracket 31. The other end of the shaft extends through the housing 11 to the exterior, where it carries a "light-dark" control in the form of rotatable knob 45.

A bracket 51 extending obliquely from the carriage 24 carries a lever arm 52 pivotally thereon, the degree of pivoting being limited by a flange 53 thereon overlying a portion of the upper edge of the lever arm. This lever arm extends through a vertical slot 54 in the housing 11 and carries a fixed knob 55 on its exterior end. Its flanged interior end 56 is juxtaposed in the toasting position to the tapered upper edge of the hook 32. A yoke-shaped bimetallic member 57 affixed at its lower ends to the superstructure 37 (but electrically insulated therefrom) extends upward flanking the latch member 33 and bridges the arm 42 extending therefrom, which has notch 58 in the upper surface thereof. The bridging portion of the yoke-shaped bimetallic member is faced with electrically insulating strip 59 on the side toward the hook 32. Two pairs of contacts, suitably insulated, are supported from the underside of the superstructure 37: a contact 61 on the superstructure is opposed to (shown spaced from) contact 62 at the free end of a contact arm 63, which carries at an intermediate location thereon a contact 64 opposed to (shown contacting) a contact 65 on a short contact arm 66. Closing of the second pair of contacts (64, 65) establishes a circuit through both the heating coil (not shown) for the heating compartment and the yoke-shaped bimetallic member, and closing of the first pair of contacts (61, 62) establishes a circuit through the heating coil only. A hook 68 on the bottom of latch member 33 depresses the longer contact arm 63.

Operation of the latching mechanism is readily understood. Depression of the knob 55 by the toaster operator lowers the carriage 24, whereupon bread carried on the attached bread-supporting bars 25 drops out of sight in the heating compartment, and the hook 32 on the latch member 33, biased toward the engaged position by the spring 41, engages the bracket 31 on the carriage and retains it in such lowered toasting position with the pivot pin 35 for the latch member located approximately midway between the ends of the vertical slot 34 therein. In this position the hook 68 on the bottom of the latch member depresses the contact arm 63 sufficiently to space only the first pair of contacts (61, 62) apart, leaving the second pair of contacts (64, 65) closed. As the yoke-shaped bimetallic member 57 heats from the flow of electrical current therethrough, it deflects at its bridging portion toward the notch 58 in the arm 42 attached to the latch member, eventually permitting the latch member to rise on its pivot pin by the depth of the notch at the urging of the compressed spring 27, whereupon the hook at the bottom rises sufficiently to lift up the short contact arm 66, spacing the second pair of contacts (64, 65) apart and thereby interrupting the circuit to the bimetallic member, and permitting the longer contact arm to rise to bring the first pair of contacts (61, 62) together and thereby continue the flow of current to the heating coil only. This completes the first or heating portion of the cycle of operation, which is of the so-called "heat-up cool-down" type.

As the bimetallic member cools, it deflects toward the latch member and, being engaged in the notch on the attached arm 42, pivots the latch member sufficiently to disengage the hook 32 from the bracket 31, whereupon the carriage 24 is forced upward by the compressed spring 27. The released latch member is pulled downward and forward on its pivot pin by the biasing spring 41 so that the bottom hook 68 depresses the contact arm 63 sufficiently to space apart the contacts in both pairs, interrupting all current flow. The "heat-up cool-down" cycle is then complete.

Lifting of the knob 55 also will release the carriage from toasting position at any time by bringing the flanged interior end 56 of the lever arm 52 in contact with the tapered edge of the hook 32, disengaging it. In any event, as the carriage rises, propelled by expansion of the compressed spring 27, to the uppermost or extreme non-toasting position (in which bread carried on the supporting bars 25 is partially exposed outside the slots 12 in the heating compartment portion of the housing 11), the top flange of the carriage comes into forcible contact with the resilient bumper member 29 located at the top of the guide rod 21 on which the carriage rides, cushioning the shock of that contact.

Figure 3:
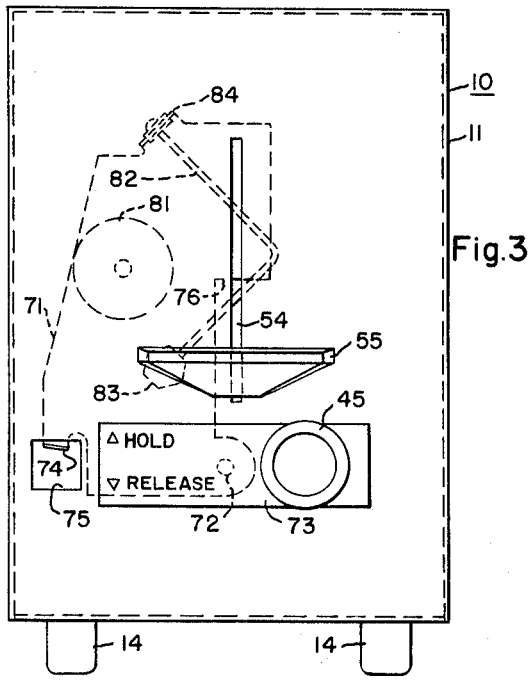
FIG. 3 is an end elevation of the same apparatus, with certain of the interior elements shown in broken lines.

Also shown in FIG. 1 are elements utilized, together with the now conventional elements already described, in the practice of the present invention. The end elevation of FIG. 3 shows, principally in broken lines, these added elements, which are located for the most part just inside the visible end of the housing 11. A plate 71 is mounted pivotally on a pin 72 through the housing (but concealed from the exterior by indicia plate 73). A handle 74 on the plate 71 protrudes to the exterior through square opening 75 in the housing at the left of the indicia plate 73. FIG. 3 shows the handle at the upper edge of the opening, opposite the word "hold" on the indicia plate, the opposite or lower position being marked "release." The plate 71, which has an irregular outline, has a notch 76 therein located in the illustrated position so as to overlap slot 54 and thereby intercept the lever arm 52 to which knob 55 is attached, during upward movement thereof. Carried on the plate are a bell 81 and a clapper arm 82 carrying a clapper 83 in propinquity to the bell. The clapper arm is fastened to an ear 84 of the plate and extends obliquely therefrom and parallel to and across the slot 54, then curves through approximately a right angle and continues in the same plane back across the slot and terminates at the clapper 83 underneath and near the bell.

Figure 4:
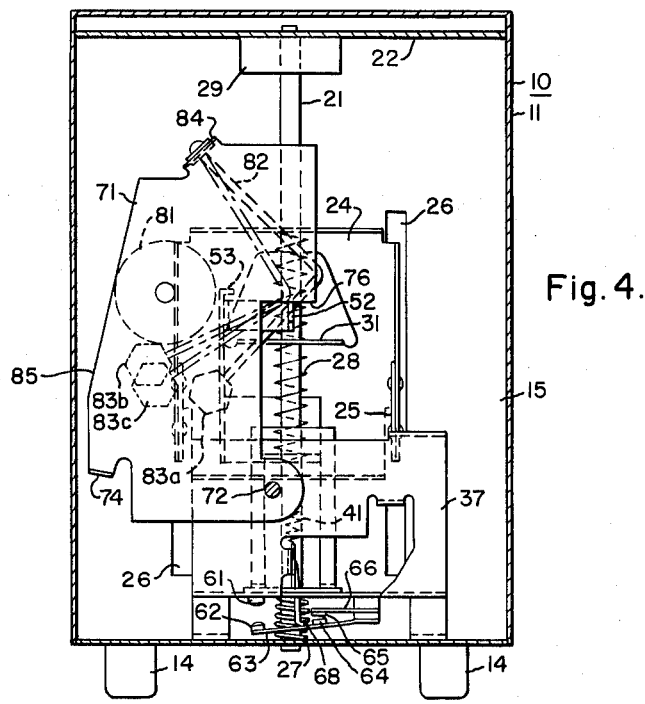
FIG. 4 is an end elevation, also partly cut away and in section, of the apparatus of the preceding views, with the bread carriage thereof in an intermediate non-toasting or "keep warm" position.

The operation of this apparatus according to the present invention will be best understood by reference to FIG. 4, which shows the carriage 24 in an intermediate nontoasting position. Upon being unlatched from the toasting position, as at the end of the "heat-up cool-down" cycle already described, the carriage will be halted, as shown, in its upward movement, by contact of the lever arm 52 with clapper arm 82 on the plate 71 (when the plate handle 74 is in the upper or "hold" position as in FIGS. 1, 3 and 4). The clapper, initially in position 83a, is deflected with the clapper arm and at position 83b strikes the bell 81, from which it rebounds to an intermediately located rest position 83c, permitting the bell to sound. The resilience of the clapper arm damps the movement of the carriage somewhat, reducing the force of its arrival at the "hold" position; while the sounding of the bell signals such arrival, thereby indicating to the operator that the toasting operation is complete.

Figure 5:
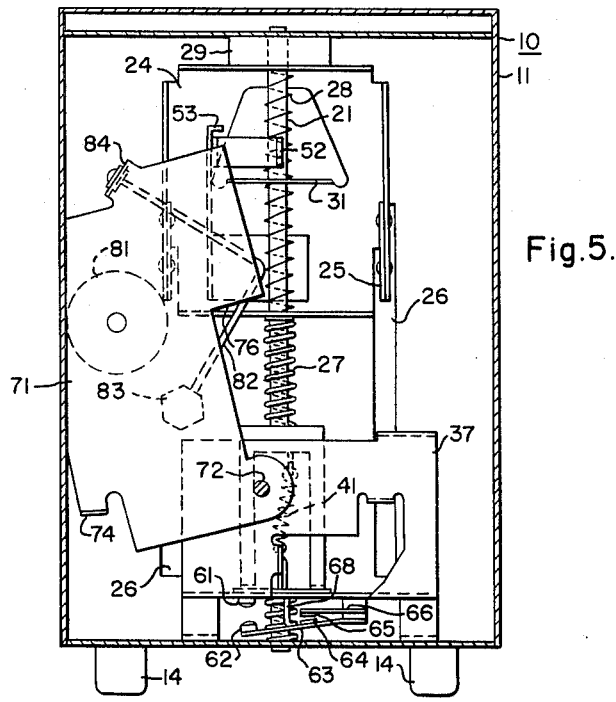
FIG. 5 is another end elevation, partly cut away and in section, with the bread carriage at the extreme non-toasting position.

By depressing the handle 74 to the lower or "release" position, the operator pivots the plate to move the clapper arm 82 aside from in front of the carriage handle so as to enable the carriage to rise to the extreme non-toasting position, shown in FIG. 5. Chamfered edge 85 accommodates the pivoting of the plate 71, coming into contact as it does with the interior side surface of the housing when the handle is in the "release" position. The toasted bread, which remained within the heating compartment in the intermediate non-toasting or "hold" position, in which it was kept warm by the residual heat retained by the elements of the heating compartment, is exposed normally to the exterior through the slots in the top of the housing after the carriage is so released, whereupon the operator may remove it and insert one or more untoasted slices to be toasted as desired.

The preferred apparatus embodiment of this invention, as illustrated and described, may be modified in structure or function without departing from the inventive concept. For example, a similarly actuated visual signal may be employed instead of or in addition to the bell, or a buzzer or the like may be substituted therefor. Parts may be combined or subdivided and other modifications made while retaining advantages and benefits of the invention, which is defined in the following claims.

I claim as my invention:

1. In a toaster, a fixed frame including a housing having a heating compartment, a bread carriage movable relative to the frame between a toasting position, in which bread carried thereon is wholly within the heating compartment, and non-toasting positions, including an extreme non-toasting position in which bread carried thereon is at least partially outside the heating compartment and including also an intermediate non-toasting position in which bread carried thereon is wholly within the heating compartment, hold means having a holding position and a non-holding position and adapted in the holding position to retain the carriage at the intermediate non-toasting position during its travel from the toasting posiion toward the exreme non-toasting position and adapted in the non-holding position to permit the carriage to travel past the intermediate non-toasting position to the extreme non-toasting position, and signal means movable to an operative position when the hold means is in the holding position for engagement by said carriage when it is moved from said toasting position to said intermediate non-toasting position to signal arrival of the carriage at the intermediate non-toasting position.

2. The apparatus of claim 1 wherein the hold means is movably mounted on the frame, and the signal means is mounted on the hold means for movement to said operative position concurrently with movement of said hold means to said holding position.

3. The apparatus of claim 1 wherein the signal means includes a signaling arm interposed in the path of the carriage from the toasting to the intermediate non-toasting position when the hold means is in the holding position.

4. The apparatus of claim 3 including means mounting said signaling arm for substantially yielding movement upon engagement of said carriage to damp the movement of the carriage as it approaches the intermediate non-toasting position.

5. In a toaster, a fixed frame including a housing having a heating compartment, a bread carriage movable relative to the frame between a toasting position, in which bread carried thereon is wholly within the heating compartment, and non-toasting positions, including an extreme non-toasting position in which bread carried thereon is at least partially outside the heating compartment and including also an intermediate non-toasting position in which bread carried thereon is wholly within the heating compartment, biasing means effective to urge the carriage from the toasting position toward the extreme non-toasting position, a plate pivotally mounted on the frame for movement between holding and non-holding positions and having a projecting portion adapted when in the holding position to intercept the carriage upon movement thereof from the toasting toward the intermediate non-toasting position and to retain it in the latter position and adapted when in the non-holding position to permit the carriage to travel past the intermediate non-toasting position to the extreme non-toasting position, a bell mounted on the plate, a spring arm mounted at one end on the plate, a clapper carried on the other end of the spring arm adjacent and normally spaced from the bell, the spring arm having an intermediate portion adjacent the projecting portion of the plate and adapted when the plate is in holding position to be contacted by the carriage in its movement from the toasting position to the intermediate non-toasting position and adapted to be flexed upon occurrence of such contact and thereby to damp the movement of the carriage and strike the bell with the clapper.

References Cited by the Examiner

UNITED STATES PATENTS

| | | | |
|---|---|---|---|
| 2,070,333 | 2/1937 | Freeman | 99—385 X |
| 2,147,376 | 2/1939 | Lucia | 99—344 X |
| 2,152,913 | 4/1939 | Padelford | 99—344 X |
| 2,336,696 | 12/1943 | McCullough | 99—391 X |
| 2,344,842 | 3/1944 | Weeks | 99—329 |
| 2,416,014 | 2/1947 | McCullough | 99—329 |
| 2,566,904 | 9/1951 | Palmer | 99—391 X |

CHARLES A. WILLMUTH, *Primary Examiner.*

ROBERT E. PULFREY, *Examiner.*

STUART E. BECK, *Assistant Examiner.*